(12) United States Patent
Yi et al.

(10) Patent No.: US 11,165,507 B2
(45) Date of Patent: Nov. 2, 2021

(54) OPTICAL TRANSMITTER AND/OR RECEIVER INCLUDING AN EMI FILTER, AND METHODS OF USING THE SAME

(71) Applicant: SOURCE PHOTONICS (CHENGDU) COMPANY LTD., Sichuan (CN)

(72) Inventors: Li Yi, Chengdu (CN); Dai Qiu, Chengdu (CN); Dejun Xu, Chengdu (CN); Chao Du, Chengdu (CN)

(73) Assignee: Source Photonics (Chengdu) Company, Ltd., Chengdu (CN)

( * ) Notice: Subject to any disclaimer, the term of this patent is extended or adjusted under 35 U.S.C. 154(b) by 705 days.

(21) Appl. No.: 16/066,267

(22) PCT Filed: Jun. 15, 2018

(86) PCT No.: PCT/CN2018/091609
§ 371 (c)(1),
(2) Date: Jun. 26, 2018

(87) PCT Pub. No.: WO2019/237349
PCT Pub. Date: Dec. 19, 2019

(65) Prior Publication Data
US 2021/0167865 A1    Jun. 3, 2021

(51) Int. Cl.
*H04B 10/69* (2013.01)
*G02B 5/28* (2006.01)
(Continued)

(52) U.S. Cl.
CPC .......... *H04B 10/6972* (2013.01); *G02B 5/28* (2013.01); *H04B 10/40* (2013.01); *H04B 10/503* (2013.01); *H04B 10/675* (2013.01)

(58) Field of Classification Search
None
See application file for complete search history.

(56) References Cited

U.S. PATENT DOCUMENTS 6,369,924 B1 * 4/2002 Scharf .................. G02B 6/4246
398/117
9,698,872 B2   7/2017 Haverinen et al.
(Continued)

FOREIGN PATENT DOCUMENTS

CN    105308874 A    2/2016

OTHER PUBLICATIONS

Haverinen Anssi Kaleva; "Methods and Apparatus for Improving Remote NFC Device Detection Using a Low Power Oscillator Circuit"; Bibliographic Data of CN105308874 (A); Feb. 3, 2016; http://worldwide.espacenet.com.
(Continued)

*Primary Examiner* — Darren E Wolf
(74) *Attorney, Agent, or Firm* — Andrew D. Fortney; Central California IP Group, P.C.

(57) ABSTRACT

Embodiments of the disclosure pertain to an optical transmitter and/or receiver comprising an electrical signal generator configured to generate an electrical signal that is unshielded or unshieldable at a predetermined frequency, a filter downstream from the electrical signal generator configured to reduce an amplitude of electromagnetic interference (EMI) at the predetermined frequency below a predetermined maximum value, an interface through which the EMI can pass in the absence of the filter, and an optical component configured to receive the electrical signal or provide an input signal to the electrical signal generator. A method of reducing EMI in an optical transmitter and/or receiver using the electrical signal generator, the filter and the optical component is also disclosed.

19 Claims, 9 Drawing Sheets

(51) Int. Cl.
     *H04B 10/40*      (2013.01)
     *H04B 10/50*      (2013.01)
     *H04B 10/67*      (2013.01)

(56) References Cited

U.S. PATENT DOCUMENTS

| | | | | |
|---|---|---|---|---|
| 2003/0020986 A1* | 1/2003 | Pang | .................... | G02B 6/4246 |
| | | | | 398/139 |
| 2006/0115279 A1* | 6/2006 | Moran | ................. | H04B 10/503 |
| | | | | 398/182 |
| 2014/0140702 A1* | 5/2014 | Truong | .............. | H04B 10/2575 |
| | | | | 398/115 |
| 2014/0370803 A1 | 12/2014 | Haverinen et al. | | |
| 2018/0175963 A1* | 6/2018 | Soto | ................... | H04B 10/5161 |

OTHER PUBLICATIONS

International Search Report and Written Opinion; PCT International Searching Authority/US dated Mar. 14, 2019; International Application No. PCT/CN2018/091609; 10 pages; International Searching Authority/United States, Commissioner for Patents; Alexandria, Viriginia.

* cited by examiner

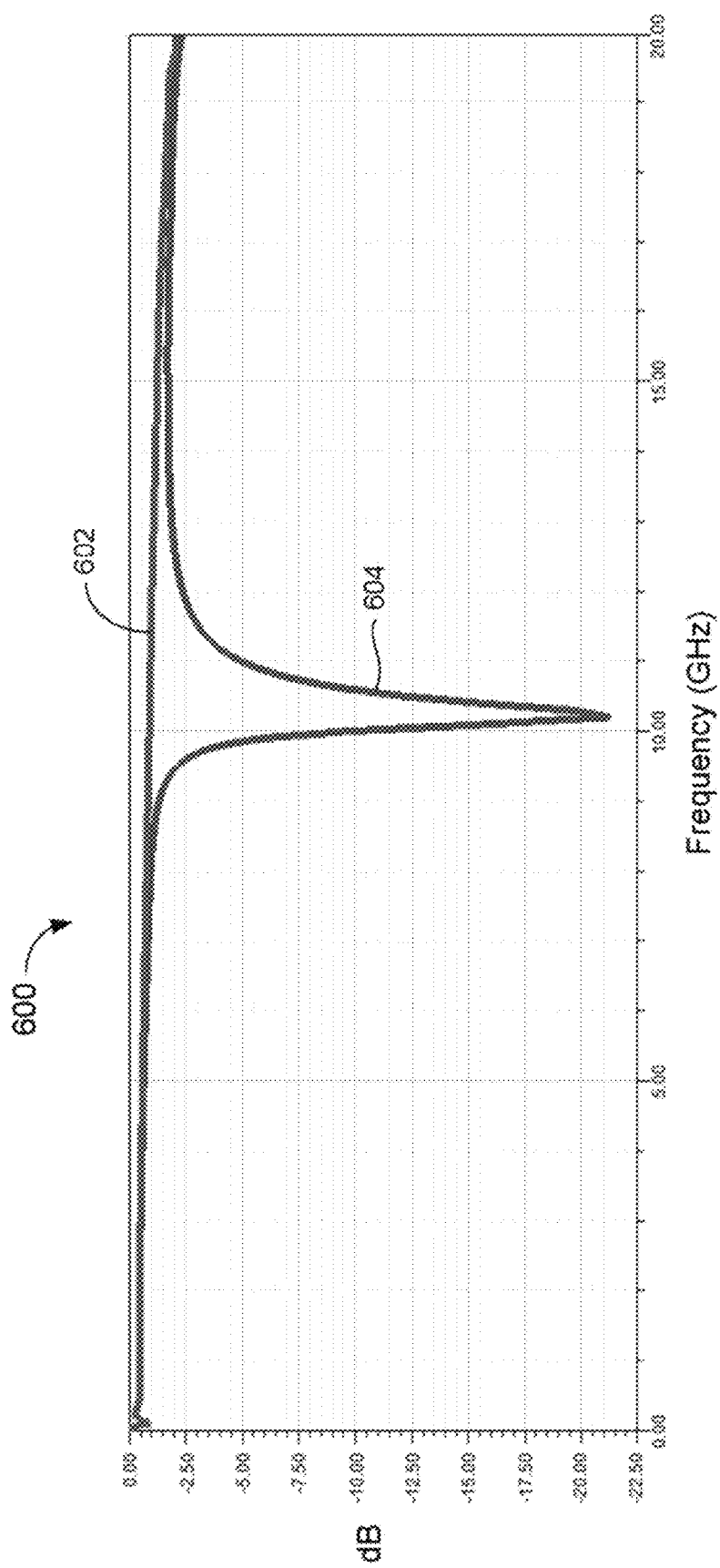

OPTICAL TRANSMITTER AND/OR RECEIVER INCLUDING AN EMI FILTER, AND METHODS OF USING THE SAME

FIELD OF THE INVENTION

The present invention relates to the field of optical or optoelectronic transmitters and/or receivers, and particularly optical or optoelectronic transmitters and/or receivers including one or more electromagnetic interference (EMI) filters.

DISCUSSION OF THE BACKGROUND

Optical or optoelectronic transceivers (which may be generally identified as "optical transceivers") convert electrical signals into optical signals and optical signals into to electrical signals. An optical transceiver may include receiver and transmitter optical subassemblies, functional circuits, and electrical and optical interfaces, and are significant components in optical fiber communication systems and data storage networks.

Electrical components in both the receiver and transmitter optical subassemblies may generate unwanted EMI (e.g., noise) in their respective circuits. The EMI may degrade the performance of other circuits and devices in proximity to the EMI-generating optical transceiver and can increase the error rate of nearby data signals. Furthermore, the level or amount of EMI from various devices is regulated by government agencies. Thus, it is desirable to decrease EMI in optical transceivers.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

In one aspect, the present invention relates to an optical transmitter and/or receiver (e.g., an optical transceiver) comprising an electrical signal generator configured to generate an electrical signal that is unshielded or unshieldable at a predetermined frequency, a filter downstream from the electrical signal generator configured to reduce an amplitude of electromagnetic interference (EMI) at the predetermined frequency below a predetermined maximum value, an interface through which the EMI can pass in the absence of the filter, and an optical component configured to receive the electrical signal or provide an input signal to the electrical signal generator. The interface can be any interface in the receiver or transmitter through which EMI can radiate and affect external circuitry or equipment, a complementary receiver or transmitter module in an optical transceiver, or other transmitter and/or receiver modules in a multi-channel optical transceiver. In general, the EMI is generated when the optical transmitter and/or receiver produces the electrical signal.

The predetermined frequency may be a target frequency of the electrical signal. For example, the target frequency may be a frequency or rate of a data signal. Alternatively, the target frequency may be an operating frequency of the optical transmitter and/or receiver (e.g., a clock frequency), or a harmonic of the target frequency.

The electrical signal may be a differential signal or a single-ended signal. Either signal may be transmitted along an electrical signal path in either the optical transmitter or the optical receiver. In embodiments in which the electrical signal path is in the optical receiver, the electrical signal generator may comprise a linear amplifier, and the optical component may comprise a photodiode configured to provide the input signal to the linear amplifier. The linear amplifier may comprise a transimpedance amplifier (TIA) and/or a limiting amplifier. The photodiode may comprise a conventional photodiode configured to convert an optical (data) signal to an electrical (data) signal. The electrical (data) signal output by the photodiode may be a single-ended or differential signal, and the linear amplifier may receive the single-ended electrical (data) signal and output the differential signal.

In embodiments in which the electrical signal path is in the optical transmitter, the electrical signal generator may comprise a laser driver, and the optical component may comprise a light emitting device configured to receive the single-ended signal. The light emitting device may comprise a laser diode. The laser diode may be or comprise a heterostructure laser diode, a quantum well laser diode, a Bragg reflector laser diode, a distributed feedback (DFB) laser diode, a vertical cavity surface-emitting laser (VCSEL), or a vertical external cavity surface-emitting laser (VECSEL), any of which may be directly modulated (e.g., a directly modulated laser, or DML) or externally modulated. In the case of external modulation, the external modulator may be configured to receive the electrical signal and modulate a continuous optical signal output by the laser diode. The combination of the laser diode and the modulator may be known as an electromodulated laser (EML).

The optical transmitter and/or receiver may further comprise a housing. The housing may house or enclose the electrical signal generator, the filter, the optical component, and the electrical signal path connecting the electrical signal generator, the filter and the optical component. In the case of the receiver, the electrical signal path connects the optical component, the electrical signal generator, and the filter in sequence, and may include a single-ended or differential signal line from the electrical signal generator to the filter and/or a receiver optical subassembly (ROSA). In the transmitter, the electrical signal path connects the electrical signal generator, the filter and the optical component in sequence, and may include a single-ended signal line or differential signal line from the electrical signal generator to the filter and/or a transmitter optical subassembly (TOSA). Alternatively, the optical component (e.g., the laser diode) in the transmitter may be mounted or secured on a printed circuit board (PCB) (e.g., a so-called "chip-on-board" [COB] architecture). In further embodiments, the housing houses or encloses the components of both the receiver and the transmitter (e.g., a transceiver), In even further embodiments, the housing (alone or in conjunction with the PCB on which the electrical signal generator, the filter, and the optical component are formed, placed or mounted) may further include an EMI shield (e.g., a conductive gasket between upper and lower parts of the housing).

In some embodiments, the filter capacitively and inductively couples the electrical signal path to a ground potential. In such embodiments, the filter may comprise a metal feature that is (i) capacitively coupled to the electrical signal path and (ii) inductively coupled with the ground potential.

In another aspect, the present invention relates to a method of reducing EMI in an optical transmitter and/or receiver, comprising (i) using an electrical signal generator, generating an electrical signal that is unshielded or unshieldable at a predetermined frequency, (ii) using a filter downstream from the electrical signal generator, reducing an amplitude of the EMI in the electrical signal at the predetermined frequency below a predetermined maximum value, and (iii) either (1) receiving in a first optical component the electrical signal in which the amplitude of the EMI is reduced or (2) providing an input signal from a second optical component to the electrical signal generator. As for the optical transmitter and/or receiver, the optical transmitter and/or receiver include(s) an interface through which the EMI can pass in the absence of the filter, and generally, generating the electrical signal may cause the optical transmitter and/or receiver to produce the EMI.

As described for the optical transmitter and/or receiver, the predetermined frequency may be a target frequency of the electrical signal, and the electrical signal may be a differential or single-ended signal. When the electrical signal is in the optical receiver, the optical component comprises a photodiode, and the electrical signal generator comprises a linear amplifier. When the electrical signal is in the optical transmitter, the electrical signal generator comprises a laser driver, and the optical component comprises a light emitting device. As is also described for the optical transmitter and/or receiver, the filter may capacitively and inductively couples the electrical signal path to a ground potential. In such embodiments, the filter may comprise a metal feature that is (i) capacitively coupled to the electrical signal path and (ii) inductively coupled to a ground potential.

The filter in the present optical transmitter and/or receiver and method dramatically reduces EMI from unshielded or unshieldable signals to acceptable levels without adversely affecting the quality of the signals. These and other features and advantages of the present invention will become readily apparent from the detailed description of various embodiments below.

BRIEF DESCRIPTION OF THE DRAWINGS

FIG. 10 is a graph showing the insertion loss as a function of frequency of a signal in the presence and absence of the exemplary filter of FIG. 8.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

For the sake of convenience and simplicity, the terms "transceiver," "optical transceiver" and "optoelectronic transceiver" may be used interchangeably, as may the terms "optical" and "optoelectronic," the terms "connected to," "coupled with," "coupled to," and "in communication with" (which include both direct and indirect connections, couplings and communications the terms "mounting," "affixing," " "attaching" and "securing" (and grammatical variations thereof), and the terms "data," "information" and "bit(s)," but these terms are generally given their art-recognized meanings.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

Figure 1:
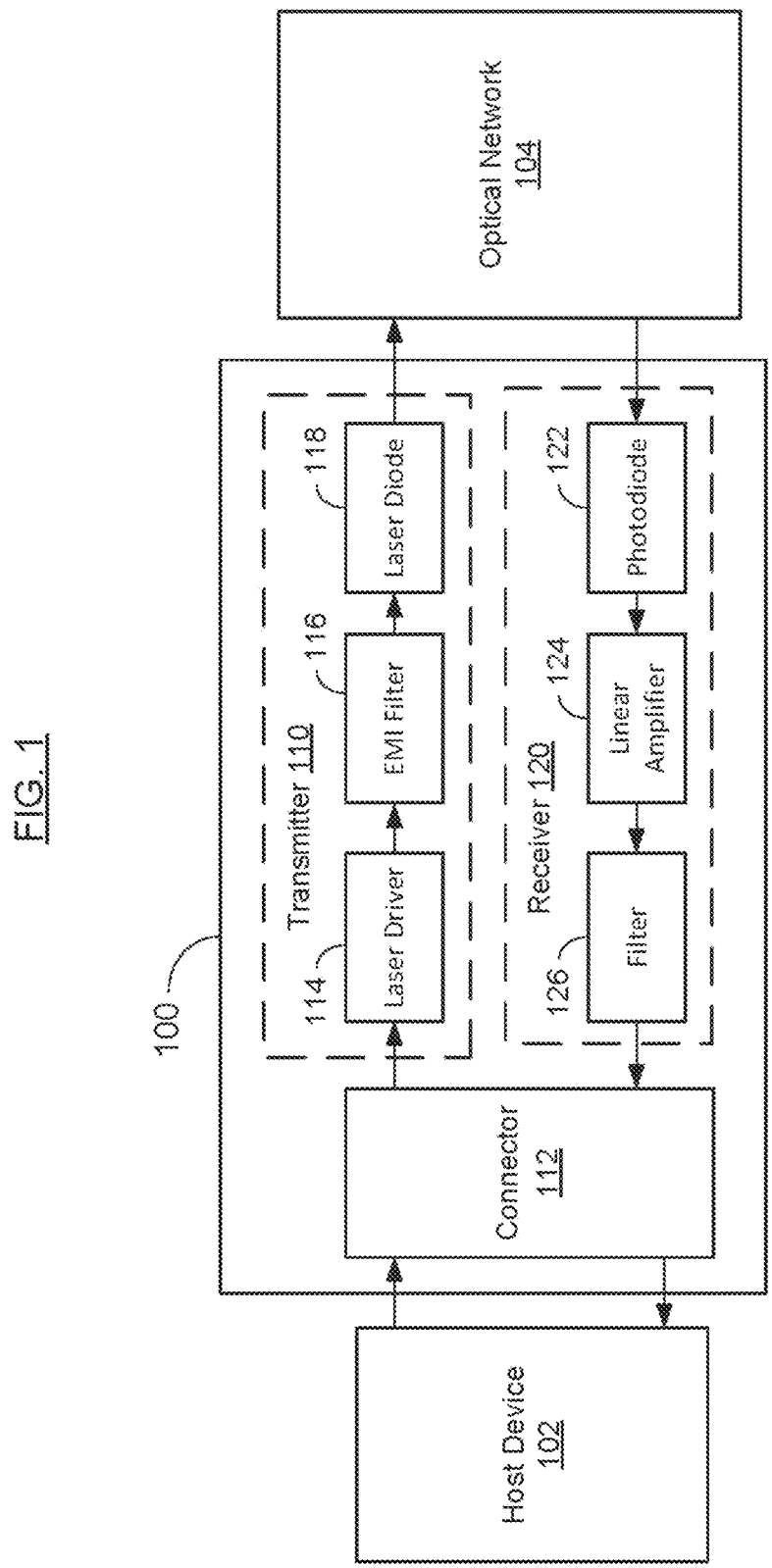
FIG. 1 is a block diagram showing an exemplary optical transceiver communicating with a host device and an optical network, in accordance with one or more embodiments of the present invention.

FIG. 1 shows an exemplary optical transceiver 100 comprising a host device 102, an optical network 104, a transmitter 110, an electrical connector 112, and a receiver 120. The transmitter 110 comprises a laser driver 114, an EMI filter 116 and a laser diode 118, and includes a transmitter signal path from the connector 112 through the laser driver 114 and the EMI filter 116 to the laser diode 118, in sequence. The receiver 120 comprises a photodiode 122, a linear amplifier 124 and a filter 126, and includes a receiver signal path from the photodiode 122 through the linear amplifier 124 and the filter 126 to the connector 112, in sequence.

The connector 112 may comprise a conventional electrical interface, including a plurality of input pins, a plurality of output pins, one or more power supply pins, one or more pins for connecting a ground plane in the optical transceiver 100 to an external ground potential, and optionally, one or more input/output pins. The input pins may include one or more pins for receiving serial electrical data (which may be single-ended or differential) from the host device 102 and one or more pins for receiving one or more control signals (e.g., a transceiver select signal, a reset signal, an interrupt signal, a transceiver data read signal, a power saving mode signal, etc.). The output pins may include one or more pins for providing serial electrical data (which may be single-ended or differential) and one or more pins for providing control signals and/or transceiver information (e.g., a transceiver ready signal, an interrupt signal, a transceiver fault or error signal, a loss of signal [LOS] indication, transceiver data and/or information such as laser diode temperature, laser diode bias current, received signal strength, power supply voltage, etc.). The input/output pins may include a pin for receiving and providing transceiver configuration information (which may be in communication with an erasable and programmable nonvolatile memory via an I2C bus), etc. However, the transmitter interface may include, for example, a circuit or trace on a flexible substrate (a so-called "flex circuit" connector), an optical body RF feed-through (e.g., an RF feedthrough connector), a laser submount (e.g., in the TOSA), and wire bonds in the RF path from the laser driver to the laser. Thus, radiated EMI in the optical transmitter can result in cross-talk to external circuitry or equipment, or a receiver and/or another transmitter contained within the same housing as the optical transmitter.

The host device 102 may be an Ethernet switch, switchboard, firewall, router, network interface card, etc. The connector 112 may electrically connect both the transmitter 110 and the receiver 120 to the host device 102. The optical network 104 may be a fiber optic network connected to the Internet and may comprise a plurality of transceivers that communicate with each other via a plurality of optical fibers. The optical signals on each of the optical fibers may also pass through one or more optical switches and/or repeaters.

The transmitter 110, the receiver 120 and the connector 112 may be contained in a single housing. The housing may include ports (on an end of the housing opposite from the connector[s] 112) configured to receive optical fibers of the optical network 104. Together, the transmitter 110, the receiver 120 and the connector 112 may be a transceiver such as a small form factor pluggable (SFP) transceiver, an XFP (10 Gigabit Small Form-Factor Pluggable) transceiver, an SFP+ (Enhanced Small Form-Factor Pluggable) transceiver, or any other standardized optoelectronic transceiver type. The housing may be configured to be removably insertable into a cage or socket of the host device 102. The housing may include a handle and/or a latching mechanism to facilitate the insertion or removal of the housing into or from the cage or socket of the host device 102.

Figure 2:
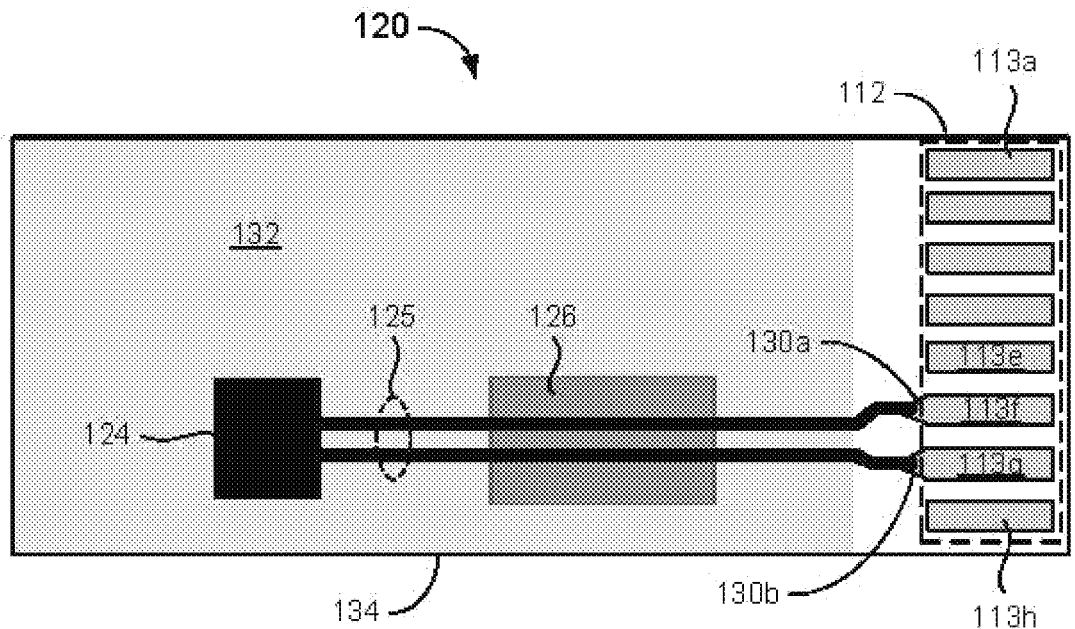
FIG. 2 shows an exemplary receiver electrical signal path in the exemplary optical transceiver of FIG. 1, in accordance with one or more embodiments of the present invention.

FIG. 2 shows components of the exemplary receiver 120, including the linear amplifier 124, a differential signal line 125, a filter 126, and a ground plane 132 on a substrate 134 (e.g., a PCB). In the exemplary receiver 120, the linear amplifier 124 provides a differential data signal on the differential signal line 125 through the filter 126 to the connector 112. However, in some embodiments, the linear amplifier 124 may provide a single-ended data signal on a single trace (e.g., one of the two traces of the differential signal line 125) through the filter 126 to the connector 112.

The connector 112 may comprise pads 113*a-h* on the substrate 134. Alternatively, the connector 112 may be on a substrate that is separate from the substrate 134 that includes the ground plane 132 (e.g., the ground plane 132 and the connector 112 may be on different substrates). The signal line 125 is electrically connected to separate pads 113*f-g* in the connector 112 via connection pads 130*a-b*. The connection pads 130*a-b* may comprise extensions of the pads 113*f-g* configured to form an ohmic connection to the traces of the signal line 125. Similar connection pads may extend from other pads 113*a-e* and 113*h*. After connections are made between certain traces on the substrate 134 (including the traces of the signal line 125) and the connection pads, the traces and connection pads may be coated with an insulator such as a plastic coating. When the ground plane 132 and the connector 112 are on different substrates, the signal line 125 may be connected to the connection pads 130*a-b* by adhesion (e.g., using a solder or a conductive adhesive) to traces on a flexible substrate (a so-called "flex connection"), which may further be joined (e.g., by adhesion) to the separate substrates.

The photodiode 122 (FIG. 1) may be connected to the linear amplifier 124 and may be at an end of the receiver 120 opposite from the electrical connector 112. The photodiode 122 is configured to receive an optical signal (e.g., in the form of a [modulated] light beam from the optical network 104) and convert the optical signal to an electrical signal, which may be single-ended or differential. Thus, the linear amplifier 124 may receive a single-ended or differential input signal (e.g., from the photodiode). The linear amplifier 124 may comprise a transimpedance amplifier (TIA) configured to amplify an electrical signal from the photodiode 122 and/or a limiting amplifier configured to amplify the output from the TIA (when present) or the electrical signal from the photodiode 122 (when the TIA is not present). Thus, the electrical signal generator may comprise the linear amplifier 124.

Differential data on the signal line 125 is defined by the difference in the voltages on the traces of the differential signal line 125. This difference may be represented by the formulas P−N and N−P, where P is the voltage (which may be a full-rail positive supply voltage) on one trace, and N is the voltage (which may be a ground potential or a full-rail negative supply voltage) on the other trace. Thus, when the differential signal line 125 is transmitting a data bit, any noise that may be on one of the traces of the differential signal line 125 tends to be canceled out by the noise on the other trace.

However, as the differential signal on line 125 switches state (e.g., from "0" to "1" or from "1" to "0" in digital logic), the voltages on the traces of the differential signal line 125 momentarily equalize, or reach a common mode. The common mode voltage is generally equal to (P+N)/2, which results in any noise on the traces of the signal line 125 being added. Thus, common mode noise may be carried on the traces of the differential signal line 125 and/or in the signals on the pads 113a-h at the data switching frequency as a result of data changing states. The common mode noise may result in EMI on the differential signal line 125 and/or the pads 113a-h at the data frequency. In fact, any signal switching activity in the optical receiver can result in EMI being radiated by the optical receiver.

Similarly, a difference between the rise time and the fall time of the differential signal on the line 12.5 can also result in EMI. Consequently, the differential signal line 125 may carry or radiate significant EMI at the data frequency. The filter 126 is configured to reduce the EMI or its amplitude below a predetermined maximum value at a predetermined frequency (e.g., the operating frequency) of the electrical signal on the differential signal line 125. The predetermined maximum value may be the maximum allowable limit of EMI (e.g., as set by applicable government regulations) or lower. The filter 126 (which may be considered to be a common mode filter when filtering a differential signal) may also be configured to reduce or prevent propagation of common mode noise at the predetermined frequency to the pads 113a-h. In embodiments where the filter 126 selectively reduces the EMI in a certain, relatively narrow frequency range (e.g., without significantly affecting the strength of signals outside the relatively narrow frequency range), the filter 126 may be a notch filter.

Figure 3A:
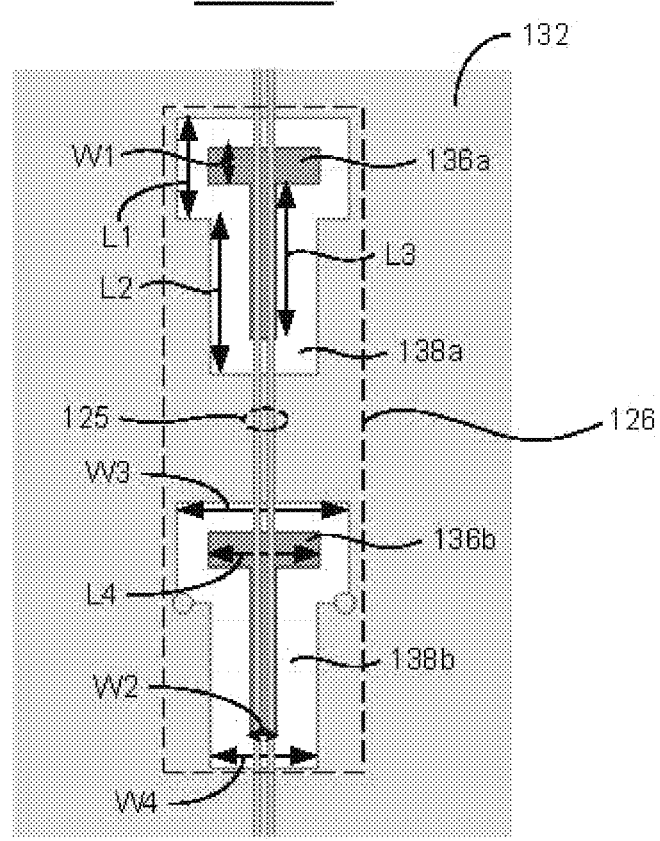
FIG. 3A shows an exemplary filter configured to remove electromagnetic interference (EMI) in the electrical signal path of the exemplary receiver of FIG. 2, in accordance with one or more embodiments of the present invention.

FIG. 3A is a layout view of the filter 126 in the ground plane 132. The signal line 125 is formed above the filter 126 and the ground plane 132 (e.g., on a dielectric layer that is, in turn, on the filter 126 and the ground plane 132). The ground plane 132, which generally comprises a metal layer on an underlying substrate and which may have a thickness of from 0.01 to 1 mm, may be patterned and/or etched (e.g., using conventional photolithography, development and wet or thy etching) to form (i) plates 136a-b that are capacitively coupled to the signal line 125 and inductively coupled to the ground plane 132 and (ii) gaps 138a-b between the respective plates 136a-b and the ground plane 132. The gaps 138a-b may comprise air or the dielectric between the filter 126 and the traces of the signal line 125. The capacitive and inductive coupling between the traces of the signal line 125, the plates 136a-h of the filter 126, and the ground plane 132 effectively couple common mode noise in the electrical signal that passes through the signal line 125 to the ground plane 132, thereby reducing the effect of such noise on the EMI generated by the optical receiver 120.

The plates 136a-b may have a T-shape as shown, although the shape of the plates 136a-b is not limited thereto and may be circular, oval, square, rectangular, I-shaped, etc. The plate 136a may be the same or substantially the same as the plate 136b, and the gap 138a may be the same or substantially the same as the gap 138b. Thus, the plates 136a-h and the gaps 138a-b may share the same dimensions, including lengths, widths, and thicknesses.

Furthermore, a single plate 136a or 136b, or more than two plates 136a-b, may be present. In the case of a single plate, the plate 136 is designed to resonate at a predetermined frequency (e.g., the output frequency or data transmission frequency). However, as a practical matter, the process for fabricating the PCB and/or the ground plane 132 may have a large margin and/or relatively wide tolerances, and may not be sufficiently well-controlled to ensure that a single-plate filter will resonate sufficiently close to the predetermined frequency (or even to a predetermined frequency band) to remove or attenuate sufficient EMI to meet government regulations and/or other standards. In particular, the thickness of the metal layer that forms the ground plane 132 may not be sufficiently controllable to ensure compliance with EMI requirements when using a single-plate filter. Use of two plates enables the filter 126 to resonate at two predetermined frequencies that can define a frequency band including the target resonance frequency (e.g., the output or data transmission frequency) plus some margin on both sides of the target resonance frequency, thereby ensuring that the filter 126 removes or attenuates the EMI sufficiently to comply with government regulations and/or standards regardless of variations in the thickness of the ground plane 132. More than two plates in the filter 126 can effectively define an even broader attenuation frequency band, but at a cost in ground plane area or real estate that may not be feasible or possible in some designs. On the other hand, when the thickness of the ground plane 132 is sufficiently controllable (i.e., is within certain, relatively narrow upper and lower limits), a single-plate filter may be an ideal solution.

With regard to the example shown in FIG. 3A, the lengths L1, L2, L3 and L4 and the widths W1, W2, W3 and W4 may be of from 0.1 to 10 mm, or any value or range of values therein. For example, the length L1 may be 1.0-3.0 mm, the length L2 may be 2.0-6.0 mm, the length L3 may be 1.5-5.0 mm, the length L4 may be 1.0-3.3 mm, the width W1 may be 0.3-1.5 mm, the width W2 may be 0.2-1.0 mm, the width W3 may be 1.5-7.0 mm, and the width W4 may be 1.2-5.0 mm.

Figure 3B:
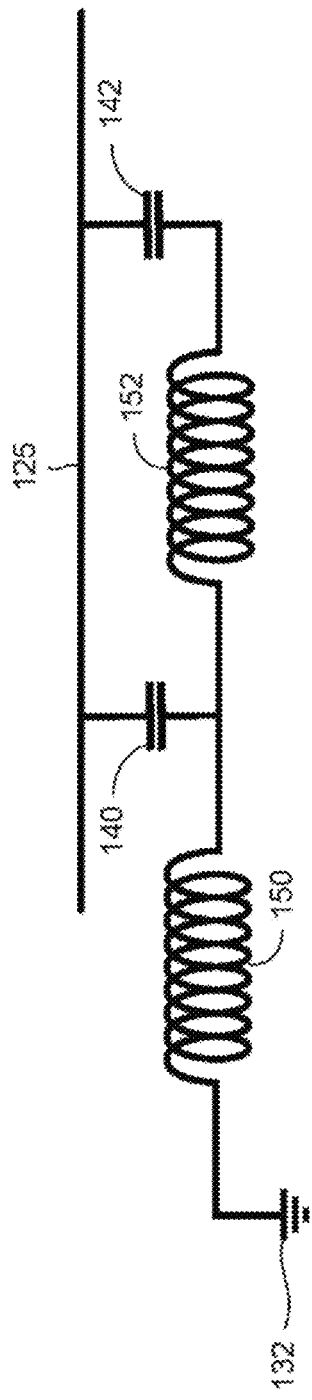
FIG. 3B is a schematic of an equivalent circuit for the exemplary filter shown in FIG. 3A, in accordance with one or more embodiments of the present invention.

FIG. 3B is a schematic of an equivalent circuit for the filter 126 shown in FIG. 3A, including the signal line 125, the ground plane 132, the capacitive coupling between the plates 136a-b and the signal line 125, and the inductive coupling between the plates 136a-b and the ground plane 132. As shown, the capacitive coupling between the traces of the signal line 125 and the plate 136a is represented by first and second parallel capacitors 140 and 142, and the inductive coupling between the plates 136a-h and the ground plane 132 is represented by first and second inductors 150 and 152. As designed, one end of the equivalent inductor chain 150-152 is connected to the ground plane 132, and the other end is floating. There are other ways to represent equivalent circuits for the filter 126 of FIG. 3A, as is known by those skilled in the art. The result is that the filter 126 functions as a conventional LC circuit, effectively coupling energy in the signal line 125 at the resonant frequency or frequencies of the LC circuit to the around plane 132.

Figure 4:
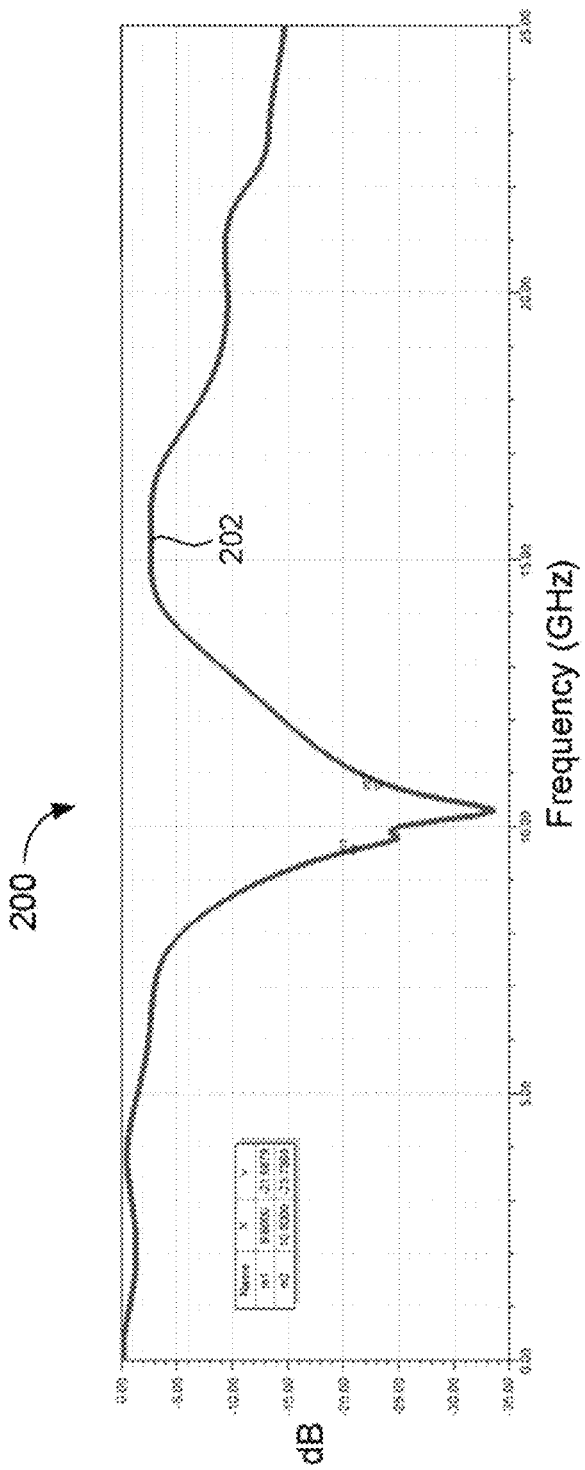
FIG. 4 is a graph showing the insertion loss of the exemplary filter of FIG. 3A as a function of frequency.
Figure 5A:
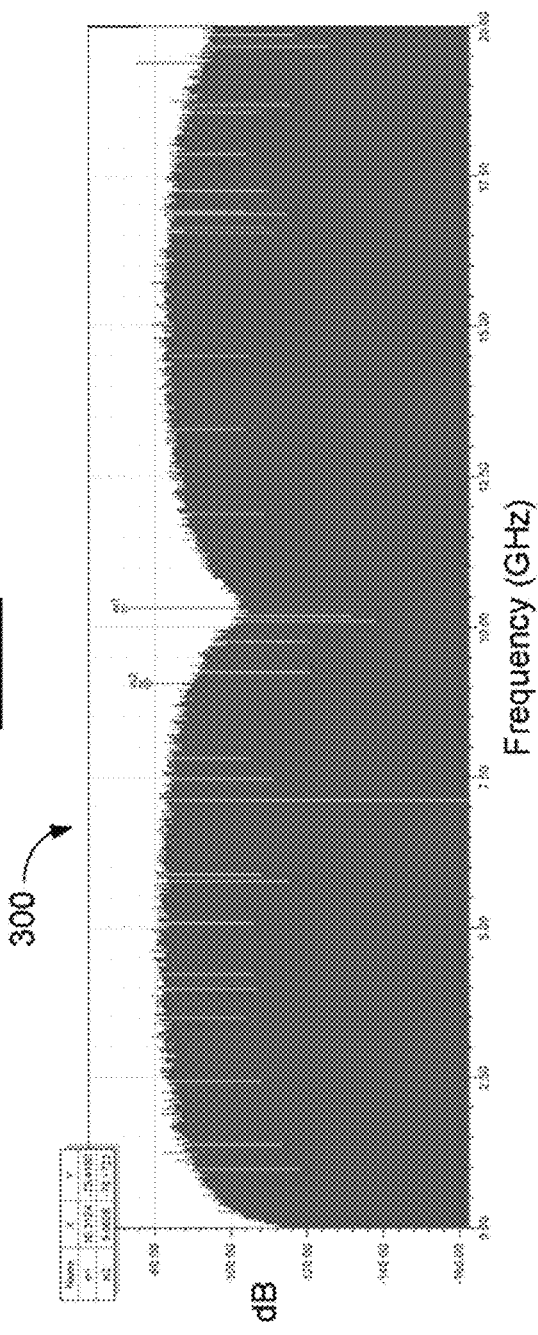
FIGS. 5A-B are graphs showing the reduction of EMI at the output frequency of the data signal on the differential electrical signal line in the exemplary receiver of FIG. 2 using the exemplary filter of FIG. 3A.
Figure 5B:
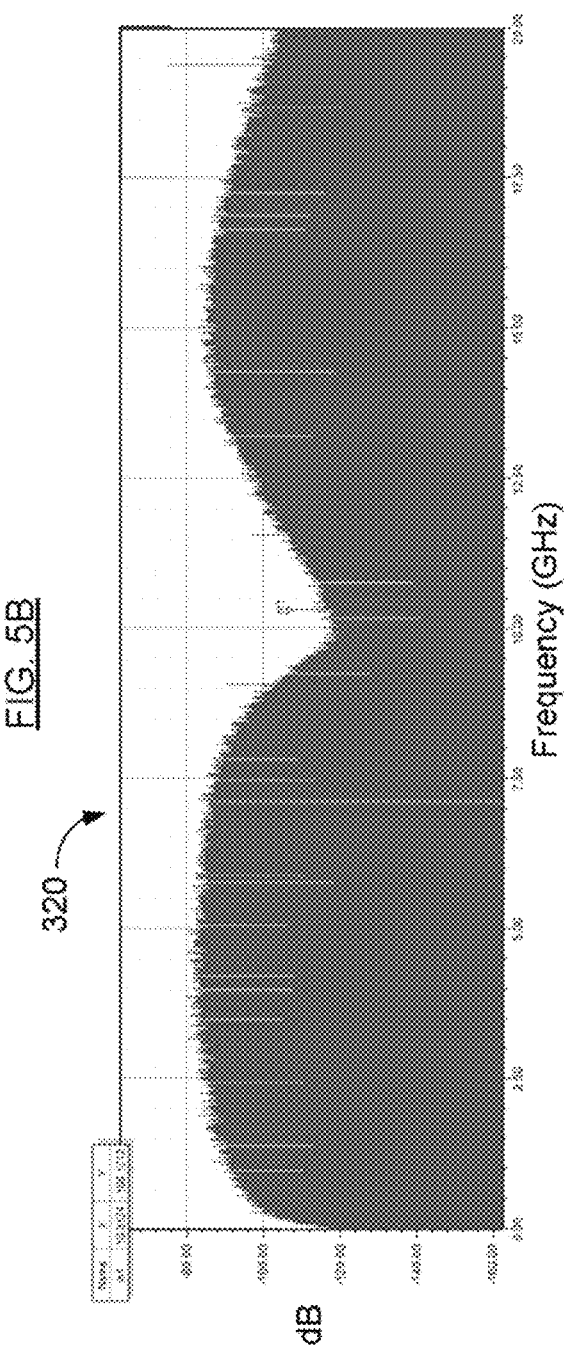
Figure 6:
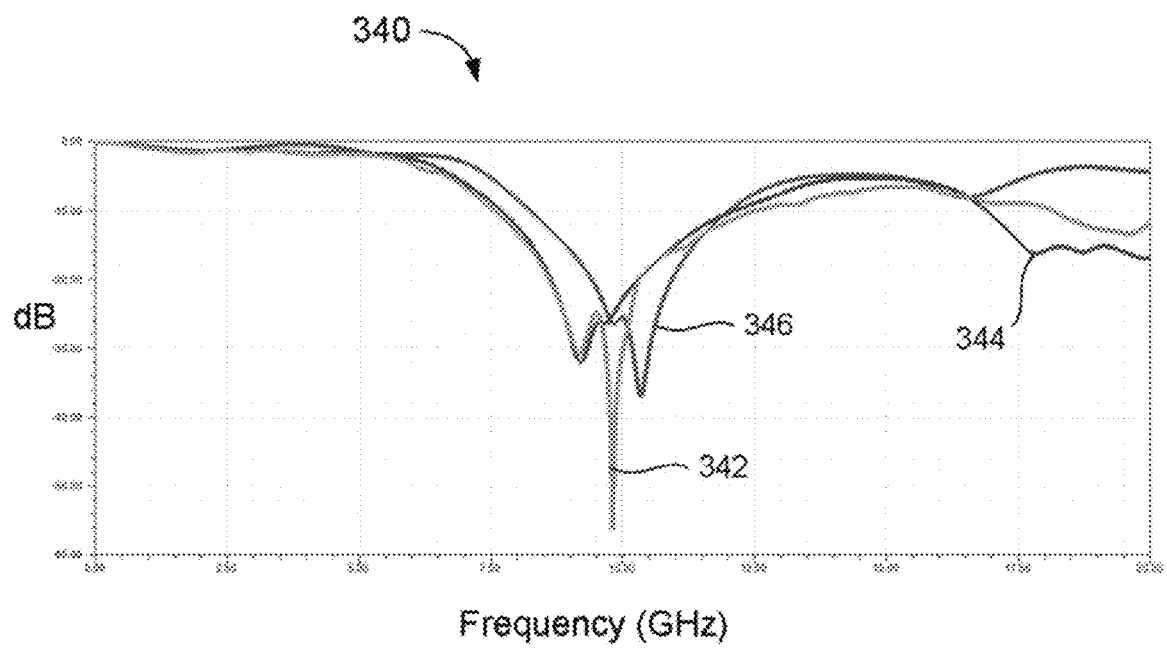
FIG. 6 is a graph showing curves of the actual insertion loss as a function of frequency for a signal in two different test/prototype filters based on the design shown in FIG. 3A and as simulated using design parameters of the exemplary filter shown in FIG. 3A.

FIGS. 4-6 are graphs showing the results of simulations and tests of the filter 126 of FIG. 3A. For example, FIG. 4 is a graph 200 that plots the insertion loss of the filter 126 (along the vertical axis, in dB) as a function of signal frequency (along the horizontal axis, in GHz). The curve 202 on the graph 200 shows the results of a simulation of the insertion loss of the filter 126 on a signal having a frequency swept from 0 to 25 GHz. The graph 200 shows that the EMI at 9.6 GHz is reduced by about 22 dB, at 10.8 GHz is reduced by about 24 dB, and at about 10.3 GHz is reduced by about 34 dB. Thus, when the target frequency for the electrical signal to be filtered is in the range of 10.0-10.5 GHz, EMI in this frequency range may be reduced significantly (e.g., by about 30 dB or more).

FIGS. 5A-B are graphs 300 and 320 that show the effect of the filter 126 in FIG. 3A on noise on a signal line that is a model for (e.g., that is similar or identical to) the differential signal line 125. FIG. 5A shows the result of a simulation in which a signal is swept from 0 to 20 GHz over a model of the ground plane 132 without the filter 126, and the signal strength is recorded (along the vertical axis, in dB). The graph 300 in FIG. 5A effectively represents noise in the signal in the absence of the filter 126. A significant spike is seen at 10.3124 GHz, a common target data reception frequency for optical receivers. The graph 320 in FIG. 5B shows the result of an identical simulation in which a signal is swept from 0 to 20 GHz over the same model of the ground plane 132, but with the filter 126. The graph 320 shows that the signal strength in the frequency range of about 10.0 to 10.6 GHz is significantly reduced, and more significantly at the target frequency of 10.3124 GHz (from about −73.4 dB to about −108.1 dB). This means that noise and EMI on the differential signal line 125 in the frequency range of about 10.0 to 10.6 GHz is significantly reduced (e.g., by about 30 dB or more), but otherwise the signals (e.g., on the differential signal line 125) are unaffected.

Figure 7:
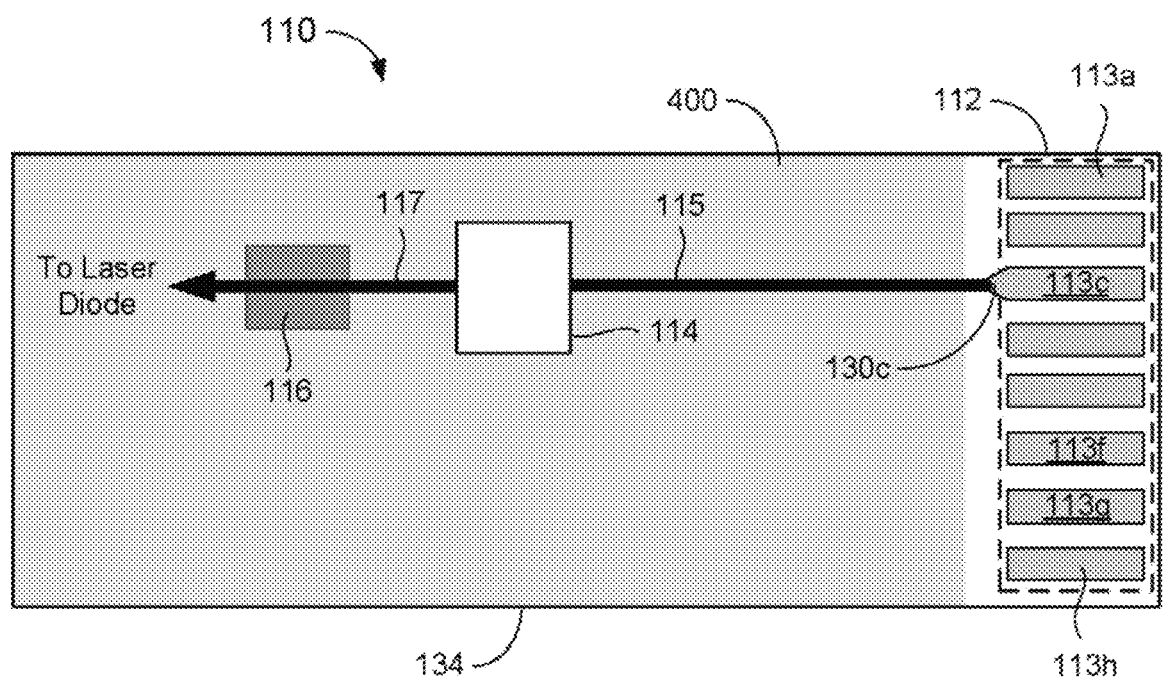
FIG. 7 shows an exemplary transmitter electrical signal path in the exemplary optical transceiver of FIG. 1, in accordance with one or more embodiments of the present invention.

FIG. 6 is a graph 340 that plots the common mode insertion loss of prototypes of the filter 126 as measured using a signal in a conventional vector network analyzer as a model for signals on the differential signal line 125 as the frequency of the signal is swept from 0 to 20 GHz for two prototype filters 126 (see FIG. 3A) and for a simulation based on a model of the two filters 126. The graph 340 juxtaposes curves 342 and 344 (the results of testing the first and second prototype filters 126) and a curve 346 (simulation results for the model of the prototype filters 126). The test data and the simulation results in FIG. 7 show acceptable similarity. In the simulation (see curve 346), the filter 126 resulted in a common mode insertion loss of about 26 dB at about 9.8 GHz and about 37 dB at about 10.4 GHz.

In the first prototype filter 126 (curve 342), the common mode insertion loss was about 30 dB at about 9.2 GHz and about 56 dB at about 9.8 GHz. In the second prototype filter 126 (curve 344), the common mode insertion loss was also about 30 dB at about 9.2 GHz and about 26 dB at about 9.6 GHz. The curves 342 and 344 are nearly identical up to about 9 GHz and from about 10.2 GHz to about 16.7 GHz, each showing an insertion loss of more than 30 dB from about 9.0 to about 9.3 GHz and more than 25 dB from about 8.5 to about 10.2 GHz. Optimization of the process for depositing, patterning and etching the ground plane is expected to improve the results (e.g., matching of test data to simulation results). Thus, the filter 126 and filters similar thereto are effective for significantly reducing EMI at a target frequency (e.g., the frequency of an electrical data signal in an optical receiver).

FIG. 7 shows components of the exemplary transmitter 110, including the laser driver 114, traces 115 and 117, a filter 116, and a ground plane 400. The trace or signal line 115 carries a single-ended signal from one of the pads 113*a-h* in the connector 112 to the laser driver 114, and the trace 117 carries a single-ended signal from the laser driver 114 to the laser diode 118 (FIG. 1) through (e.g., over) the filter 116. In an alternative embodiment, the trace 115 may be replaced with two parallel traces that carry a differential signal from two adjacent) pads 113*a-h* in the connector 112 to the laser driver 114, and/or the trace 117 may be replaced with two parallel traces that carry a differential signal from the laser driver 114 through the filter 116 to the laser diode 118. The pad(s) 113*a-h* that provide the electrical signal to the trace or signal line 115 in the transmitter are different from the pad(s) 113*a-h* that receive the electrical signal on the signal line 125 in the receiver.

The laser driver 114 receives an electrical data signal (e.g., from the host device 102) and drives the laser diode 118 to output an optical data signal (e.g., using the single-ended driver signal on trace 117). Thus, in some embodiments, the electrical signal generator in the present optical transceiver comprises the laser driver 114, which can receive a single-ended or differential data signal, and which can output a single-ended or differential driver signal to the laser diode 118.

The ground plane 400 may be on the same substrate 134 as the connector 112 and/or the receiver ground plane 132. In such embodiments, the signal line 115 may be electrically connected to the pad 113*c* in the connector 112 via a connection pad 130*c*, in the same or substantially the same manner as the traces in the signal line 125 (FIG. 2). The substrate containing the ground plane 400 may be different from or the same as the substrate containing the ground plane 132 (FIGS. 2-3A), but the material(s) of the around plane 400 and the ground plane 132 may be the same (e.g., aluminum or an aluminum alloy, copper, silver, etc.), and one or more dimensions of the ground plane 400 and the ground plane 132 (e.g., the thickness) may be the same. In some embodiments, the ground planes 400 and 132 are continuous or otherwise electrically connected.

The laser diode 118 (FIG. 1) may be connected to the laser driver 114 via the trace 117 and may be at an end of the transmitter 110 opposite from that of the connector 112. The laser diode 118 may be a light-emitting device configured to receive the driver signal and convert the electrical signal to an optical output signal (e.g., in the form of a [modulated] light beam to be transmitted over an optical fiber in the optical network 104). In some embodiments, the transmitter 110 may further comprise (1) a bias circuit configured to provide a bias signal (e.g., a bias current or a bias voltage) to the laser diode 118 and/or the laser driver 114, and/or (2) a modulator configured to modulate the outgoing optical signal from the laser diode 118. When the modulator is present, the combination of the modulator and the laser diode may comprise an electromodulated laser (EMU). Each of the receiver 120 and transmitter 110 may independently further include (i) a lens adjacent to an optical fiber connector and/or (ii) a mirror or a beam combiner (or beam splitter) in the optical path between the lens and either the laser diode 118 or the photodiode 122, as the case may be.

Noise (e.g., from circuitry in the transmitter 110 or external devices or circuitry connected thereto) may be carried on the traces 115 and/or 117. The noise may result in EMI at the frequency of the data signal on the trace 115 or the driver signal on the trace 117, and the trace 117 may carry significant EMI at the data frequency. The data switching and laser driver signal switching also contributes to the EMI. However, the receiver interface may also include, for example, a flex circuit, a trace on a flexible connector, an optical body RF feed-through device, a wire bond between the linear amplifier and a downstream component. Thus, radiated EMI in the optical receiver can result in cross-talk to external circuitry or equipment, or a transmitter and/or another receiver contained within the same housing as the optical receiver. The filter 116 is configured to resonate at a predetermined frequency (e.g., the data frequency or an operating frequency of one or more circuit elements in the transmitter 110 receiving a clock signal, such as the laser driver 114) or at endpoints of a frequency range that includes the predetermined frequency, and thus has dimensions that enable such resonance. By resonating at a predetermined frequency or frequency range including the predetermined frequency, the filter 116 reduces the EMI (or its amplitude) below a predetermined maximum value at the predetermined frequency. The predetermined maximum value may be the maximum allowable limit of EMI (e.g., at the predetermined frequency) or lower.

Figure 8:
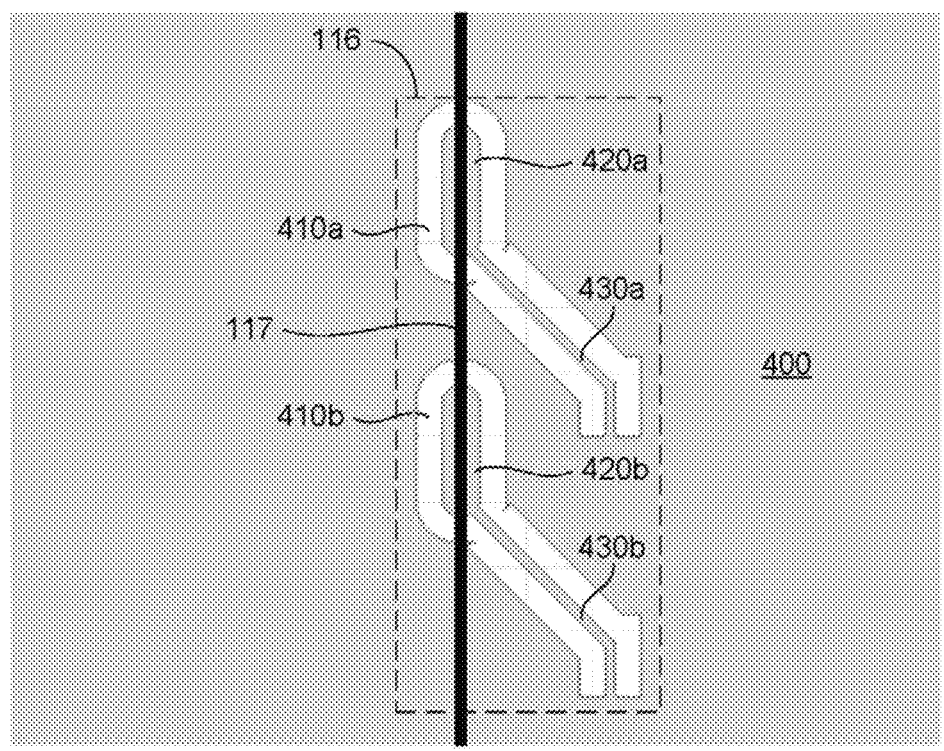
FIG. 8 shows an exemplary filter configured to remove EMI in the electrical signal path of the exemplary transmitter of FIG. 8, in accordance with one or more embodiments of the present invention.

FIG. 8 is a layout view of an exemplary filter 116 in the ground plane 400. The ground plane 400 may comprise a metal layer (which may or may not be patterned) on a stiff or inflexible substrate (e.g., a circuit board). The ground plane 400 may be similar or substantially identical to the ground plane 132 in the optical receiver 120 (see, e.g., FIG. 3A and the discussion thereof supra). The filter 116 may be formed in the ground plane 400 by photolithographic patterning and etching (e.g., using a patterned photoresist).

The filter 116 comprises first and second plates 420a-b capacitively coupled to the signal line 117 and first and second traces 430a-b that inductively couple the plates 420a-b to the ground plane 400. Patterns 410a-b define the dimensions of the plates 420a-b that are capacitively coupled to the trace 117 and may be etched in the metal layer (e.g., aluminum, copper, etc.) forming the ground plane 400 by, for example, conventional photolithography.

The pattern 410a, the plate 420a and the trace 430a may be the same or substantially similar to the pattern 410b, the plate 420b, and the trace 430b, respectively. The patterns 410a-b, the plates 420a-b and the traces 430a-b may each have a length and width of from 0.1 to 10 mm, or any value or range of values therein. For example, the width of each of the patterns 410a-h may be 0.1-2.0 mm. The width of each of the capacitor plates 420a-b may be 0.1-4.0 mm, and the length of each of the capacitor plates 420a-h may be of from 1.0 mm to 5.0 mm. The width of each of the traces or links 430a-h may be 0.1-2.0 mm, and the length of each of traces or links 430a-h may be from 1.0 mm to 8.0 mm.

The filter 116 is designed (and thus has dimensions) such that the filter 116 resonates at the predetermined frequency of the electrical signal on the trace 117, and therefore couples noise (e.g., EMI) at the predetermined frequency into the ground plane 400, similar to the filter 126 in the optical receiver 120 (see, e.g., FIG. 2 and the discussion thereof supra). Thus, the equivalent circuit shown in FIG. 3B for the filter 126 in the optical receiver 120 also applies to the filter 16 in the optical transmitter 110. In alternative embodiments, the filter 116 may include a single plate 420 or more than two plates 420a-b, as for the filter 126. In embodiments where the filter 116 comprises two or more plates 420a-h and selectively reduces the EMI in a certain, relatively narrow frequency range (e.g., without significantly affecting the strength of signals outside the relatively narrow frequency range), the filter 116 may be a notch filter.

Figure 9:
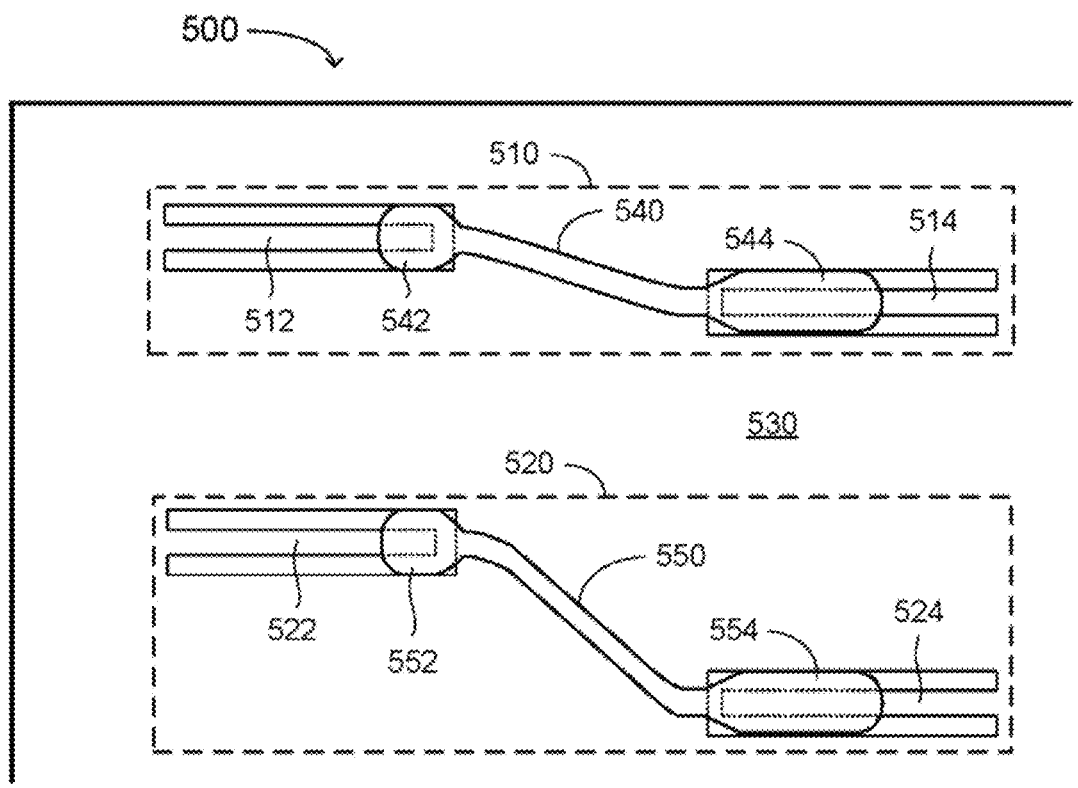
FIG. 9 shows an exemplary filter configured to remove EMI in electrical signal paths of an exemplary multichannel optical transmitter, in accordance with one or more embodiments of the present invention.

FIG. 9 is a layout diagram of alternative filters 510 and 520 for a multi-channel optical transmitter or receiver 500. Each of the filters 510 and 520 includes first and second plates and/or bars 512/514 and 522/524, respectively, formed in a ground plane 530. The optical transmitter 500 further includes first and second traces 540 and 550 over the ground plane 530. The traces 530 and 540 are spaced apart from the respective filters 510 and 520 by an insulator or dielectric layer (e.g., having a thickness of 3-100 μm). Each of the filter/trace combinations 510/540 and 520/550 represent a channel in the optical transmitter or receiver 500. Thus, the optical transmitter or receiver 500 may have 4, 8, 10, 12, 16 or more filter/trace combinations (and an identical number of channels).

The traces 540 and 550 also include first pads 542 and 552 and second pads 544 and 554, respectively. The pads 542, 544, 552 and 554 provide a surface for making ohmic contact to an overlying electrical device (e.g., the photodiode, the linear amplifier, the laser driver, or the laser diode/external modulator). As shown, capacitive coupling between the pads 542 and 544 and the plates/bars 512 and 514, respectively, and inductive coupling between the plates/ bars 512 and 514 and the ground plane 530 effectively couples the noise and/or EMI on the traces 510 and 520 to the ground plane 530.

Figure 11A:
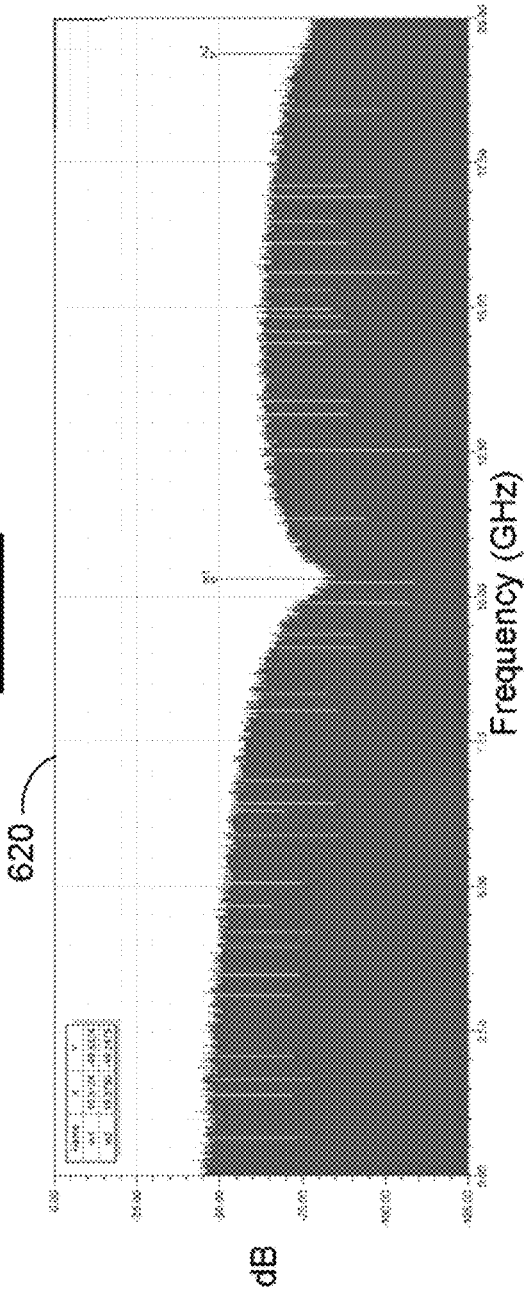
FIGS. 11A-B are graphs showing the reduction of EMI at the output frequency of the data signal strength in the exemplary transmitter of FIG. 7 using the exemplary filter of FIG. 8.
Figure 11B:
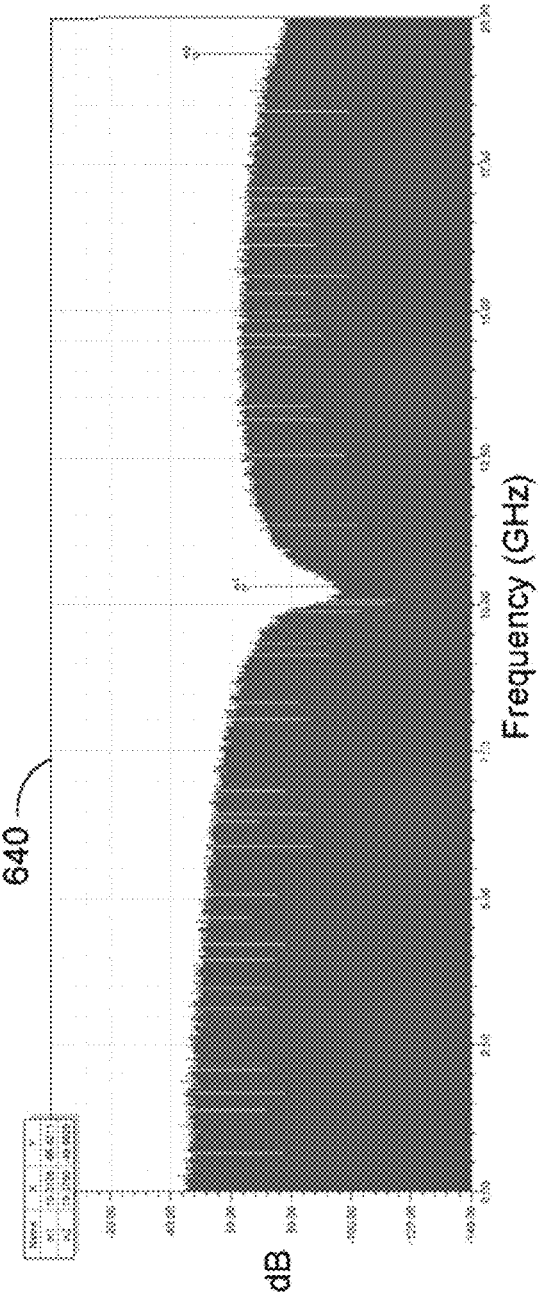
Figure 12:
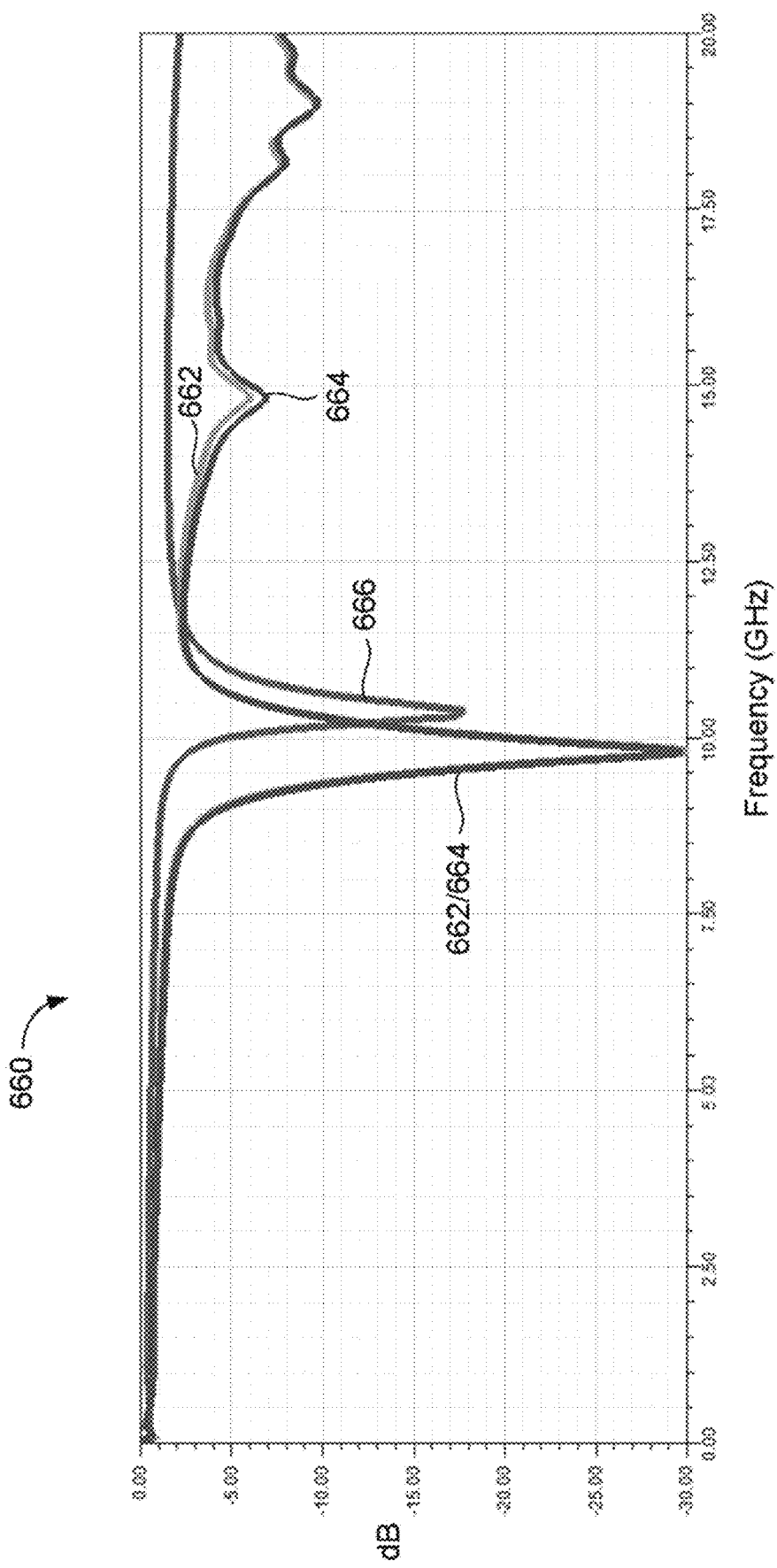
FIG. 12 is a graph showing curves of the insertion loss as a function of frequency for two different test/prototype filters based on the design shown in FIG. 8 and as simulated using design parameters of the exemplary filter shown in FIG. 8.

FIGS. 10-12 are graphs showing the results of simulations and tests of the filter 116 in various model systems for filtering a single-ended electrical signal on the trace 117 (see, e.g., FIG. 9). For example, FIG. 10 is a graph 600 that plots the insertion loss of the filter 116 (along the vertical axis, in dB) as a function of frequency (along the horizontal axis, in GHz) of a signal passed through or over the filter 116, swept from 0.0 to 20.0 GHz. The curves 602 and 604 show the results of simulations of the insertion loss of the ground plane 400 without the filter 116 (curve 602) and with the filter 116 (curve 604). A comparison of the two curves 602 and 604 shows that energy (e.g., noise and/or EMI) in the signal is reduced by about 21 dB at a frequency of about 10.1 GHz. Thus, when the target frequency for the singled-ended signal on the trace 117 is in the range of 10.0-10.5 GHz, EMI in this range may be reduced significantly (e.g., by about 20 dB or more) using the filter 116 or a filter similar thereto.

FIGS. 11A-B are graphs 620 and 640 showing the effect of the filter 126 in FIG. 3A on noise on a signal line that is a model for (e.g., that is similar or identical to) the trace 117. FIG. 11A shows the result of a simulation in which a signal is swept from 0 to 20 GHz over a model of the ground plane 400 without the filter 116, and the signal strength is recorded (along the vertical axis, in dB). The graph 620 in FIG. 11A effectively represents noise in the signal line 117 in the absence of the filter 116. A significant spike (i.e., decrease in insertion loss) is seen at 10.3124 GHz.

The graph 640 in FIG. 11B shows the result of an identical simulation in Which a signal is swept from 0 to 20 GHz over the same model of the ground plane 400, but with the filter 116. The graph 640 shows that the signal strength in the frequency range of about 9.8 to about 11.0 GHz is significantly reduced (e.g., by about 1.5 dB or more), and more significantly at the target frequency of 10.3124 GHz (e.g., from about −49.5 dB to about −66.4 dB). This means that noise and EMI on the signal line 117 in the frequency range of about 9.8 to about 11.0 GHz may be significantly reduced (e.g., by about 15 dB or more), but otherwise the signals (e.g., on the signal line 117) are unaffected.

FIG. 12 is a graph 660 that plots the insertion loss of the filter 116 (along the vertical axis, in dB) as the frequency (along the horizontal axis, in GHz) of a signal is swept from 0.0 to 20.0 GHz for two prototypes of the filter 116 in a conventional vector network analyzer and a simulation based on a model of the two prototype filters 116 as a model for signals on the signal line 117. The graph 660 juxtaposes the curves 662 and 664 (the results of testing the first and second prototype filters 116) and a curve 666 (simulation results for the model of the prototype filers 116).

The first and second prototype filters 116 (curves 662 and 664) showed an insertion loss of about 30 dB at about 9.8 GHz. In fact, the results for the first and second prototype filters 116 were nearly identical across the entire frequency spectrum tested. In the simulation (curve 666), the insertion loss was about 18 dB at about 10.4 GHz. Thus, the test data and simulation results in FIG. 12 show acceptable similarity.

Thus, in general, both the optical transmitter 110 and the optical receiver 120 may include:

(1) An electrical signal generator configured to generate an electrical signal that is unshielded or unshieldable at a predetermined frequency. In the case of the transmitter 110, the electrical signal generator may comprise a laser driver. In the case of the receiver 120, the electrical signal generator may comprise an amplifier (e.g., a linear amplifier).

(2) A filter downstream from the electrical signal generator, configured to reduce an amplitude of EMI at the predetermined frequency to below a predetermined maximum value. The filter may comprise a metal feature capacitively coupled to the signal line carrying the electrical signal to be filtered and inductively coupled to a ground potential.

(3) An interface through which the EMI can pass in the absence of the filter. In the case of the transmitter 110, the interface may be the housing or shell that contains the laser driver 114, the trace 117, the filter 116, and the laser diode 118. In the case of the receiver 120, the interface may be the connector 112.

(4) An optical component configured to receive the electrical signal or provide an input signal to the electrical signal generator. In the case of the transmitter 110, the optical component may comprise the laser diode 118. In the case of the receiver 120, the optical component may comprise the photodiode 122.

In a further aspect, the present invention also relates to a method of reducing electromagnetic interference (EMI) in an optical transmitter and/or receiver. At a first step, an electrical signal is generated using an electrical signal generator. The electrical signal may be unshielded or unshieldable at a predetermined frequency. The electrical signal may be transmitted on a single-ended or differential signal line in either the optical receiver or the optical transmitter. If the transmitter and receiver are combined (i.e., the optical transmitter and/or receiver is an optical transceiver), a first electrical signal (e.g., a received data signal) may be transmitted on the single-ended or differential signal line in the electrical path of the optical receiver, and a second electrical signal (e.g., a data output signal for transmission through an optical fiber) may be transmitted on the single-ended or differential signal line in the electrical path of the optical transmitter.

At a second step, the electrical signal is filtered using a filter downstream from the electrical signal generator. Such filtering may reduce the EMI at the predetermined frequency below a predetermined maximum value (e.g., the allowable EMI limit at the predetermined frequency or within a predetermined frequency range). The filter may include a capacitively- and inductively-coupled metal feature that couples energy in the signal at the predetermined frequency (or predetermined frequency band) in the signal line to a ground potential. For example, the metal feature (e.g., a plate or bar) patterned in the ground plane may be capacitively coupled to the signal line and inductively coupled to the ground plane. If the optical transmitter and the optical receiver are combined into an optical transceiver, there may be two filters (one in each of the optical transmitter and the optical receiver), and if the optical transmitter and/or the optical receiver include(s) more than one channel, each channel may have its own unique filter, although each filter in the optical transmitter is generally the same as the other filters in the optical transmitter, and each filter in the optical receiver is generally the same as the other filters in the optical receiver.

The optical transmitter and/or receiver include(s) an interface through which the EMI can pass in the absence of the filter. For example, EMI that is generated in the optical receiver (or in an optical transceiver that includes the optical receiver) may radiate from and/or pass through the electrical interface (e.g., a connector or electrical interface such as a "golden finger"), and EMI radiating from a signal line between a laser driver and a laser diode in an optical transmitter can pass through the housing of the optical transmitter (or of an optical transceiver that includes the optical transmitter).

At a third step, in the case of the optical transmitter, the electrical signal (in which the amplitude of the EMI has been reduced) is received in a first optical component a laser diode or other similar light emitting device, such as the modulator of an EML). In the case of the optical receiver, at a zeroth step (i.e., before the first step above), an electrical input signal may be provided to the electrical signal generator from a second optical component (e.g., a photodiode).

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical transmitter and/or receiver, comprising:
   an electrical signal generator configured to generate an unshielded electrical signal at a predetermined frequency on a single-ended or differential signal line;
   a filter downstream from the electrical signal generator configured to reduce an amplitude of electromagnetic interference (EMI) at the predetermined frequency, the filter comprising:
      a substrate,
      a metal ground plane on the substrate, and
      a plurality of plates in the metal ground plane, capacitively coupled to the signal line, inductively coupled to the ground plane, and configured to resonate at the predetermined frequency;
   an interface through which the EMI can pass in the absence of the filter; and
   an optical component configured to receive the electrical signal or provide an input signal to the electrical signal generator.

2. The optical transmitter and/or receiver of claim 1, wherein the optical transmitter and/or receiver generates the EMI when the electrical signal is generated.

3. The optical transmitter and/or receiver of claim 1, wherein the electrical signal is a data signal having a frequency or rate, and the predetermined frequency is the frequency or rate of the data signal.

4. The optical transmitter and/or receiver of claim 1, wherein the electrical signal is a differential signal on the differential signal line.

5. The optical transmitter and/or receiver of claim 4, wherein the electrical signal generator comprises a linear amplifier, and the optical component comprises a photodiode configured to provide the electrical signal to the linear amplifier.

6. The optical transmitter and/or receiver of claim 1, wherein the electrical signal is a single-ended signal on the single-ended signal line.

7. The optical transmitter and/or receiver of claim 6, wherein the electrical signal generator comprises the laser driver, and the optical component comprises a light emitting device configured to receive the single-ended signal.

8. The optical transmitter and/or receiver of claim 7, wherein the light emitting device comprises a laser diode.

9. The optical transmitter and/or receiver of claim 1, wherein the ground plane is coupled to a ground potential, and each of the plates comprises a metal feature, connected to and/or continuous with the ground plane.

10. A method of reducing electromagnetic interference (EMI) in an optical transmitter and/or receiver, comprising:
using an electrical signal generator, generating an unshielded electrical signal at a predetermined frequency;
using a filter downstream from the electrical signal generator, reducing an amplitude of the EMI in the electrical signal at the predetermined frequency, wherein the optical transmitter and/or receiver include an interface through which the EMI can pass in the absence of the filter, and the filter comprises a substrate, a metal ground plane on the substrate, and a plurality of plates in the metal ground plane, capacitively coupled to the signal line, inductively coupled to the ground plane, and configured to resonate at the predetermined frequency; and
either (i) receiving in a first optical component the electrical signal in which the amplitude of the EMI is reduced or (ii) providing an input signal from a second optical component to the electrical signal generator.

11. The method of claim 10, wherein the optical transmitter and/or receiver generates the EMI when the electrical signal is generated.

12. The method of claim 10, wherein the electrical signal is a data signal having a frequency or rate, and the predetermined frequency is the frequency or rate of the data signal.

13. The method of claim 10, wherein the electrical signal is a differential signal.

14. The method of claim 13, wherein the optical component comprises a photodiode, and the electrical signal generator comprises a linear amplifier.

15. The method of claim 10, wherein the electrical signal is a single-ended signal.

16. The method of claim 15, wherein the electrical signal generator comprises a laser driver, and the optical component comprises a light emitting device.

17. The method of claim 10, wherein the ground plane is coupled to a ground potential, and each of the plates comprises a metal feature connected to and/or continuous with the ground plane.

18. The optical transmitter and/or receiver of claim 3, wherein the predetermined frequency is in a range of 8.5-10.8 GHz.

19. The method of claim 12, wherein the predetermined frequency is in a range of 8.5-10.8 GHz.

* * * * *